United States Patent
Brink

(10) Patent No.: US 6,681,919 B1
(45) Date of Patent: Jan. 27, 2004

(54) SCRAPER BIAS APPARATUS

(75) Inventor: Jan Louis Brink, Centurion (ZA)

(73) Assignee: SLIC Trading Company Limited, Belize (BZ)

( * ) Notice: Subject to any disclaimer, the term of this patent is extended or adjusted under 35 U.S.C. 154(b) by 36 days.

(21) Appl. No.: 10/019,103

(22) PCT Filed: Jun. 22, 2000

(86) PCT No.: PCT/ZA00/00115

§ 371 (c)(1),
(2), (4) Date: Dec. 20, 2001

(87) PCT Pub. No.: WO00/78650

PCT Pub. Date: Dec. 28, 2000

(30) Foreign Application Priority Data

Jun. 24, 1999 (ZA) .............................. 99/4167

(51) Int. Cl.⁷ .............................. B65G 45/00

(52) U.S. Cl. .............................. 198/499

(58) Field of Search ................... 198/497, 499

(56) References Cited

U.S. PATENT DOCUMENTS

| | | | |
|---|---|---|---|
| 4,696,389 A | 9/1987 | Schwarze | |
| 5,088,965 A | 2/1992 | Swinderman et al. | |
| 5,378,202 A | 1/1995 | Swinderman | |
| 5,975,281 A | 11/1999 | Yoshizako et al. | |
| 6,056,112 A | 5/2000 | Wiggins | |
| 6,296,105 B1 * | 10/2001 | Carnes | 198/499 |
| 6,454,080 B1 * | 9/2002 | Brink | 198/497 |

FOREIGN PATENT DOCUMENTS

| | | |
|---|---|---|
| DE | 19748070 | 5/1999 |
| WO | WO 9824716 | 6/1998 |

* cited by examiner

Primary Examiner—Joseph E. Valenza
(74) Attorney, Agent, or Firm—Brinks Hofer Gilson & Lione

(57) ABSTRACT

A torsion unit (14) for use with a conveyor belt scraper (12) which includes a tubular component (36), an extension member (38) which is located at least partly inside the tubular component (36), at least one resiliently deformable torsion element inside the tubular component which acts between opposed surfaces of the tubular component and the extension member, and a flange on the tubular component.

19 Claims, 7 Drawing Sheets

SCRAPER BIAS APPARATUS

BACKGROUND OF THE INVENTION

This invention relates generally to scraper arrangements for conveyor belts and particularly is concerned with apparatus for biasing scrapers into contact with a conveyor belt surface at a location which is adjacent, near or on a head pulley.

A primary belt scraper or, more generally, a scraper at a head pulley of a conveyor belt, may be called upon to exert a substantial scraping action. To achieve this objective the scraper must be biased into scraping engagement with the conveyor belt surface which is to be cleaned, with a fair amount of force but in such a way that the scraper is deflectable, away from the belt, by significant obstructions on the belt.

The biasing arrangement which is adopted should be capable of being reset, from time to time, to compensate for wear on the scraper due to use. It is also desirable to be able to mount the scraper in different orientations to take account of different operative requirements U.S. Pat. No. 5,992,614 relates to a tensioning device which enables an adjustable force to be exerted on a shaft which supports a scraper blade. A spring is used to provide a resilient force applying mechanism.

The spring is not self-dampening and is exposed and hence is subject to corrosion. Another factor is that a scraper blade is mounted directly to the shaft in a fixed orientation. A variation of this arrangement is shown in PCT/ZA98/19863.

EPO 583 731 shows a basic arrangement, which has a similar effect to the device of U.S. Pat. No. 5,992,614, but wherein the biasing force is generated by twisting a resilient tube about its axis. Different mounting configurations are shown, but there is no positional adjustment facility. EPO 497 324 shows a similar arrangement.

SUMMARY OF THE INVENTION

According to one aspect of the invention there is provided a scraper arrangement for use with a conveyor belt which includes an elongate member to which at least one scraper blade is mounted, a support for the elongate member which allows at least limited rotation of the elongate member relatively to the conveyor belt with the scraper blade in scraping engagement with the belt, a tubular component which is mounted for at least limited rotation relatively to the elongate member, at least one resiliently deformable torsion element, at least partly inside the tubular component, means for retaining the tubular component at a selected angular orientation with the torsion element in a deformed state characterised therein that the tubular component has an angular inner surface, an angular extension member is located at least partly inside the tubular component and the torsion element acts between the angular inner surface and the extension member.

The torsion element may be located at least partly inside the tubular component bearing against a surface or surfaces of the extension member which are within the tubular component.

The scraper arrangement may include four torsion elements respectively positioned at four inner corners of the tubular component, bearing respectively against four outer sides of the extension member.

In one form of the invention the scraper arrangement includes a clamp engaged with the elongate member, which permits at least limited rotational adjustment of the scraper blade relatively to the tubular component.

The scraper arrangement may include a mounting bracket whereto the tubular component is mounted for limited sliding adjusting movement relatively to the bracket.

The invention also provides a torsion unit for use with a conveyor belt scraper which includes a tubular component, an extension member which is located at least partly inside the tubular component, at least one resiliently deformable torsion element inside the tubular component, and a flange on the tubular component, characterised therein that the tubular component has an angular inner surface, the extension member is angular and the torsion element acts between opposed surfaces of the angular inner surface and the extension member.

The flange may be located at an end of the tubular component and the extension member may project from the tubular component at this end.

The torsion unit may be provided in combination with a scraper which has an elongate member, at least one scraper blade mounted to the elongate member, and mounting means to fix the elongate member to support structure so that the elongate member is rotatable at least to a limited extent relatively to the support structure, the extension member of the torsion unit being engaged with the elongate member and the combination including means for securing the flange of the torsion unit to the mounting means with the torsion element in a desired state of deformation.

The torsion unit may include a clamp which permits at least limited rotational adjustment of the scraper blade relatively to the torsion unit and the torsion unit may also include a bracket to which the tubular component is mounted so that the tubular component is slidably movable, to a limited extent, relatively to the bracket.

BRIEF DESCRIPTION OF THE DRAWINGS

The invention is further described by way of examples with reference to the accompanying drawings in which.

DESCRIPTION OF PREFERRED EMBODIMENTS

Figure 1:
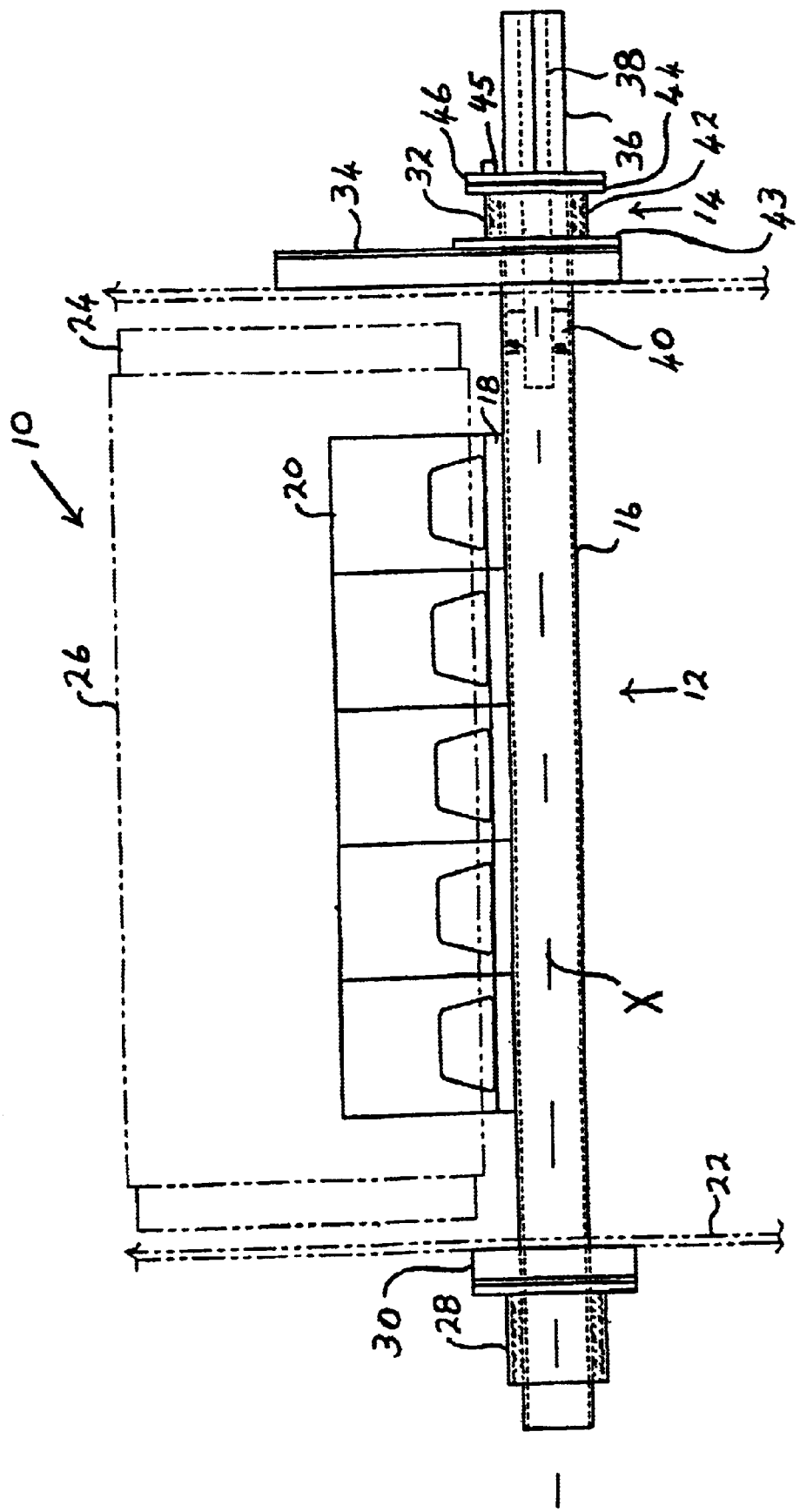
FIG. 1 is an end view of a scraper arrangement according to the invention.
Figure 2:
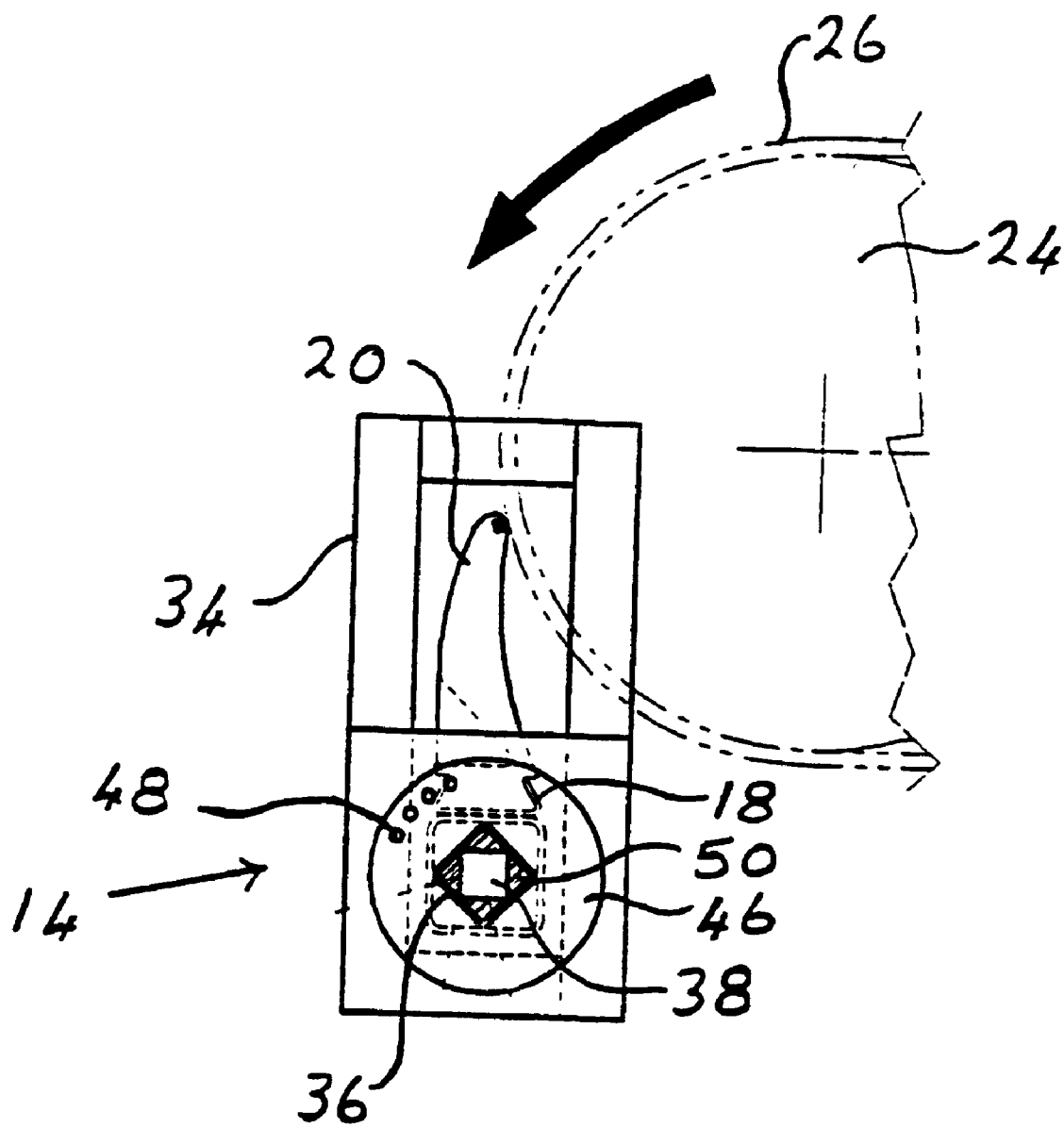
FIG. 2 is a side view of the arrangement shown in FIG. 1.

FIGS. 1 and 2 of the accompanying drawings illustrate a scraper arrangement 10 according to the invention which includes a conveyor belt scraper 12 and a torsion unit 14.

The conveyor scraper 12 includes an elongate tubular support shaft 16, which is square in cross-section, and which has a tapered channel section 18 secured to an upper surface. A plurality of scraper blades 20 are engaged with the channel section.

The shaft 16 is mounted to conventional fixed support structure 22, shown in dotted outline in FIG. 1, adjacent a conveyor head pulley 24. A conveyor belt 26 passes over the pulley.

At one end the shaft 16 is supported by a bearing 28 which is mounted to a support plate 30 which, in turn, is fixed to the structure 22.

At an opposing end the scraper shaft 16 is supported by a bearing 32 which is fixed to a mounting bracket 34. The mounting bracket is fixed to the support structure 22 in any suitable manner.

The torsion unit 14 includes an outer torsion tube 36 and an inner torsion bar 38. The tube 36 is square in profile, see FIG. 2. The torsion bar 38 is also square in profile but is angularly displaced relatively to the tube 36 through 45°. As is evident from FIG. 1 the torsion bar extends from the torsion tube 36 into the interior of the tubular support shaft 16. The extended torsion bar has two relatively small pieces 40 of rectangular steel bar fixed to it on opposing sides. The pieces 40 fit snugly inside the tubular scraper shaft and effectively link the torsion bar to the scraper shaft in such a way that rotation of the scraper shaft imparts rotational movement to the torsion bar, and vice versa. On the other hand it is relatively easy to engage the torsion bar with the scraper shaft for this is effected merely by sliding the torsion bar and the steel pieces 40 into the tubular interior of the scraper shaft.

The bearing 32 is in a housing 42 which is directly fixed, on one side, by means of a flange 43 to the mounting bracket 34. A flange 44 is fixed to an opposing side of the bearing housing.

A second flange 46 is fixed to the torsion tube 36. The flange 46 has a number of holes 48 formed through it, at spaced intervals, see FIG. 2. The flange 44 has a series of holes formed in it. If the flanges 46 and 44 are rotated relatively to one another then different holes 48 are progressively brought into alignment with one of the holes in the flange 44. A bolt or pin can be passed through the holes which are in alignment and in this way the angular orientation of the flange 46, relatively to the flange 44, can be adjusted, within reason, and the flange 46 can then be locked in position. The holes 48 are spaced fairly close to one another and in practice permit the angular orientation of the flange 46 to be adjusted, relatively to the flange 44, in increments of 2½°.

Four torsion elements 50 are positioned inside the torssion tube 36. Each torsion element is made from round rubber and, when compressed, has a substantially triangular cross-section. As is shown in FIG. 2 each torsion element is located at an inner corner of the tube 36 and is in contact with a flat outer side of the torsion bar 38.

The angular position of the torsion bar 38 relatively to the shaft 16 is fixed through the medium of the steel pieces 40 which prevent relative rotation of the torsion bar and the scraper shaft. The shaft 16 is however rotatable, at least to a limited extent, about the bearings 28 and 32. The torsion tube 36, apart from the flange 46, is fixed to the torsion bar 38 only through the medium of the torsion elements 50.

If a rotational force is exerted on the torsion tube 36, using a suitable lever such as a spanner which is engaged with the torsion tube 36, then the resulting force is transmitted to the torsion bar via the rubber torsion elements 50. There is a tendency for the scraper a shaft 16 to rotate in the same direction and in this way the scraper blades 20 can be urged into scraping engagement with an outer surface of the conveyor belt 26 with a force which is dependent on the level of torque applied to the torsion tube 36.

The scraper blades 20 can thus be urged into scraping contact with the conveyor belt with a scraping force which is controllable depending on the extent to which the torsion tube 36 is rotated relatively to the fixed structure 22. When the torsion tube 36 is rotated the flange 46 rotates relatively to the adjacent flange 44, which it is to be noted, is not movable relatively to the fixed structure 22. A pin 45 is then inserted through the hole 48 which is in register with the locating hole in the flange 44 and the assembly can be locked in position.

If an obstruction on the belt 26 exerts substantial force on one or more of the scraper blades 20 then such blades are capable of deflecting in that the resulting force, generated by the obstruction, causes the scraper shaft 16 to rotate about its elongate axis X against the action of the torsion elements 50 which are further deformed to allow such deflecting movement to take place.

If scraping edges of the scraper blades become worn then the force which is exerted by the scraper blades on the conveyor belt surface is reduced. The force can be increased simply by rotating the torsion tube relatively to the fixed structure in a direction which compensates for the wear whereafter the two flanges 44 and 46 are again fixed to one another.

FIGS. 3 to 6 illustrate variations of the invention which is shown in FIGS. 1 and 2 and, where applicable, components which are the same in the various embodiments bear similar reference numerals.

Figure 3:
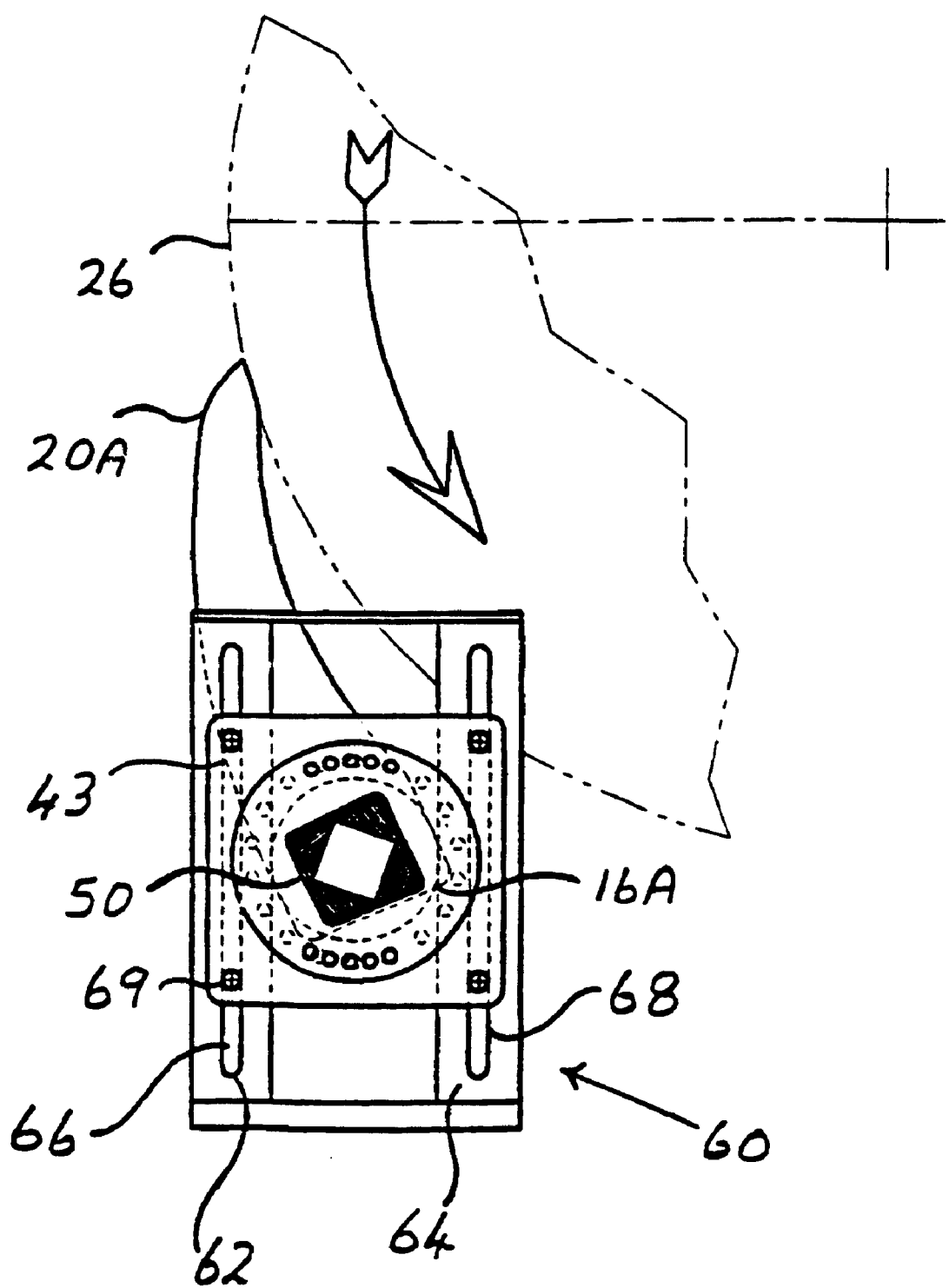
FIG. 3 shows a different type of scraper arrangement, with a height adjustment mechanism.

FIG. 3 shows an arrangement wherein the support shaft 12 and the torsion unit 14 are mounted to brackets 60 an opposing sides of the conveyor belt 26. The brackets are substantially identical and only one bracket is shown in FIG. 3.

The bracket 60 includes two uprights 62 and 64 which are formed with respective elongate vertically extending slots 66 and 68. The flange 43 of the torsion unit 14 is attached to the bracket by means of bolts which pass through holes 69 in the flange and which are engaged with the slots.

It is apparent from an inspection of FIG. 3 that the torsion unit and the belt scraper 12 are movable, in unison, upwards or downwards, according to requirement, in order to bring one or more scraper blades 20A into engagement with an outer surface of the conveyor belt 26. When the scraper arrangement is at a desired position the bolts are tightened thereby to lock the flange 43 to the bracket 60.

The opposing side of the scraper arrangement, not shown in the drawing, is adjusted in a corresponding manner.

The scraper blade 20A may be attached to a support shaft 16A in a similar way to what has been described in connection with FIG. 2, or in any other way.

Figure 7:
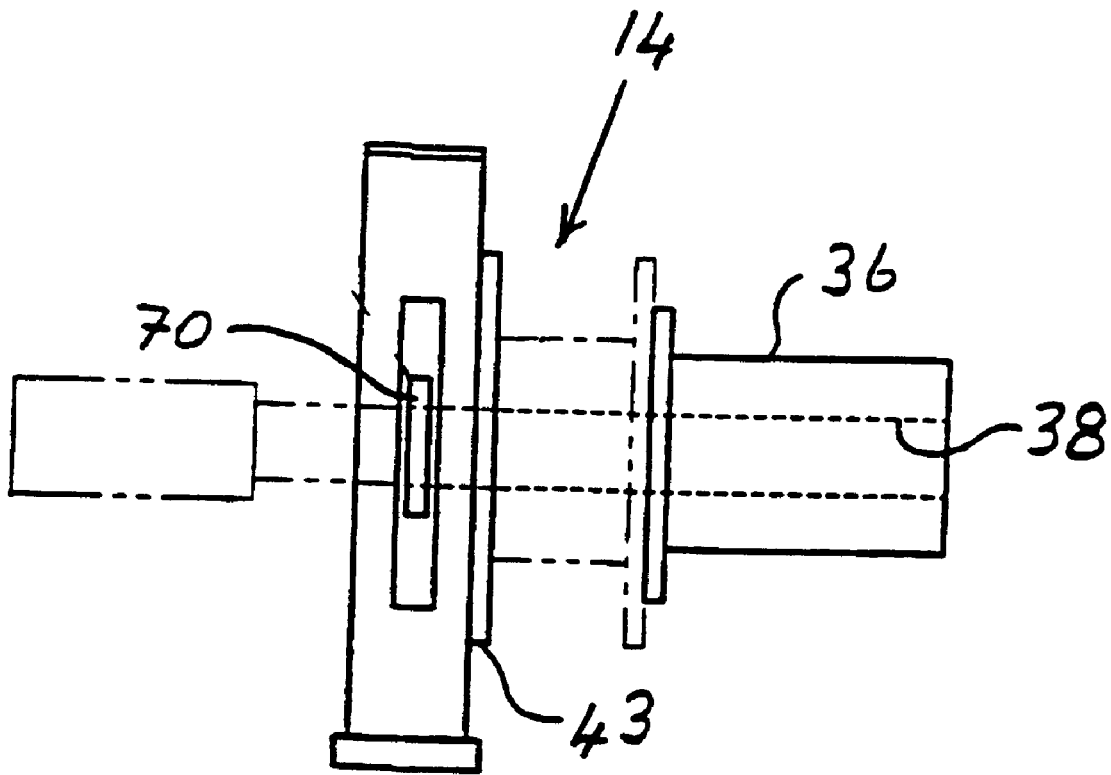
FIG. 7 is a side view of a mounting or bias system which is particularly suited for the arrangements of FIGS. 4 to 6 wherein the scrapers are mounted to arms.

The arrangement of FIG. 3, viewed from the side, is generally as is shown in FIG. 7. The construction is substantially the same as what is shown in FIG. 1 and, as before, if the torsion tube 36 is rotated relatively to the inner torsion bar 38 the torsion elements 50 between the tube and the torsion bar are distorted and thereby exert a resilient biasing force on the scraper blade 20A which urges the blade into resilient engagement with the conveyor belt 26.

Figure 4:
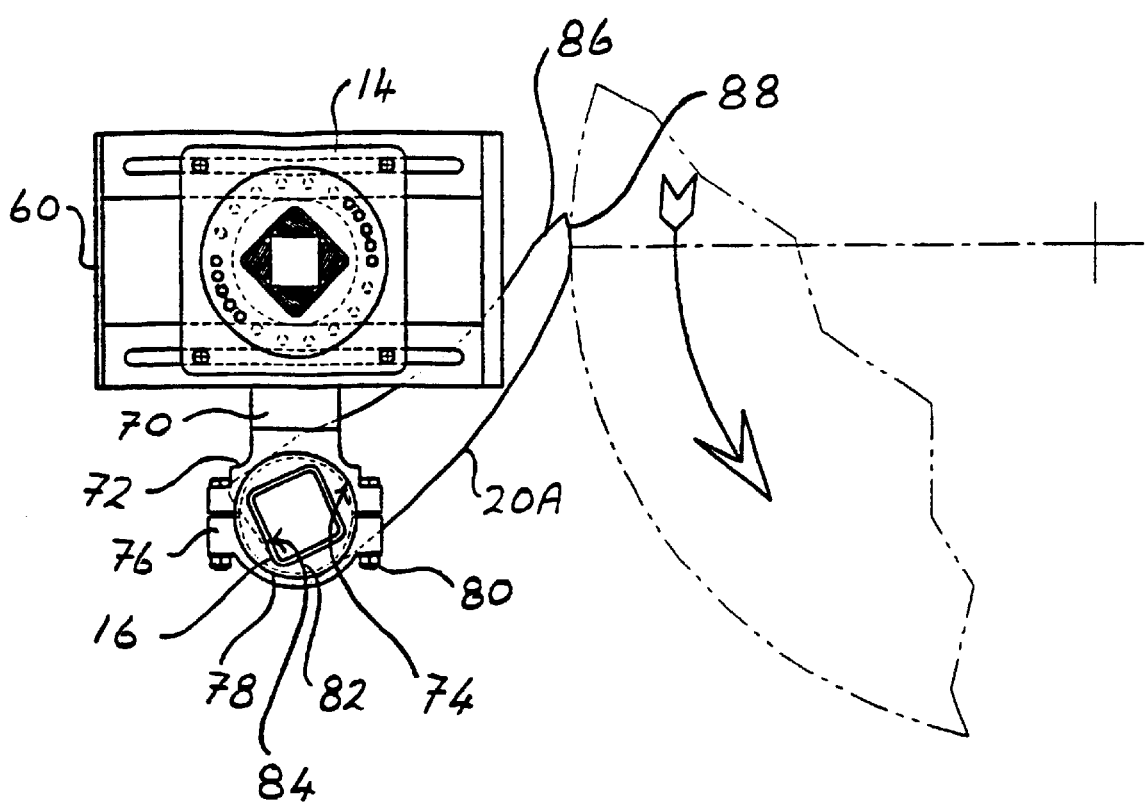
FIGS. 4 and 5 show a scraper blade which is mounted to an arm, in different orientations.

In the arrangements of FIGS. 1, 2 and 3 the scraper blade or blades extend directly from the support shaft 16 which is co-axial with the torsion unit 14. In the arrangement shown in FIGS. 4, 5 and 6 the torsion units are displaced from the support shafts. FIG. 4 illustrates an arrangement wherein the torsion unit 14 is mounted to a bracket 60 in a similar manner to what has been described in connection with FIG. 3. An arm 70 (refer to FIG. 7 as well) extends from the torsion unit. The arm terminates in a clamp section 72 which has an inner semi-circular formation 74. A similar clamp section 76, also with an inner semi-circular formation 78, is engageable with the clamp section 72. The two sections can be fixed tightly together by means of bolts 80.

The support shaft 16, as before, has scraper blades 20A attached to it. This is done in any appropriate way. A mounting bush 82 is fitted over the support shaft. The bush is round in outline and is formed with a square hole 84 which is complementary in size and shape to the outer surface of the support shaft 16. Thus the bush can be threaded onto the shaft and moved to a desired position at which the bush is enclosed by the clamp sections 72 and 76.

The arrangement is such that when the clamp sections 72 and 76 are loose the scraper blades and the support shaft 16 can be rotated, in unison, to a desired angular orientation relatively to the arm 70. At this stage the bolts 80 are tightened and the scraper blades are then held in the desired orientation.

The configuration shown in FIG. 4 thus permits sliding adjustment of the torsion unit and rotational adjustment of the scraper blades relatively to the belt which is to be cleaned. This is in addition to the adjustable bias which is provided by the torsion unit which has already been described.

Figure 5:
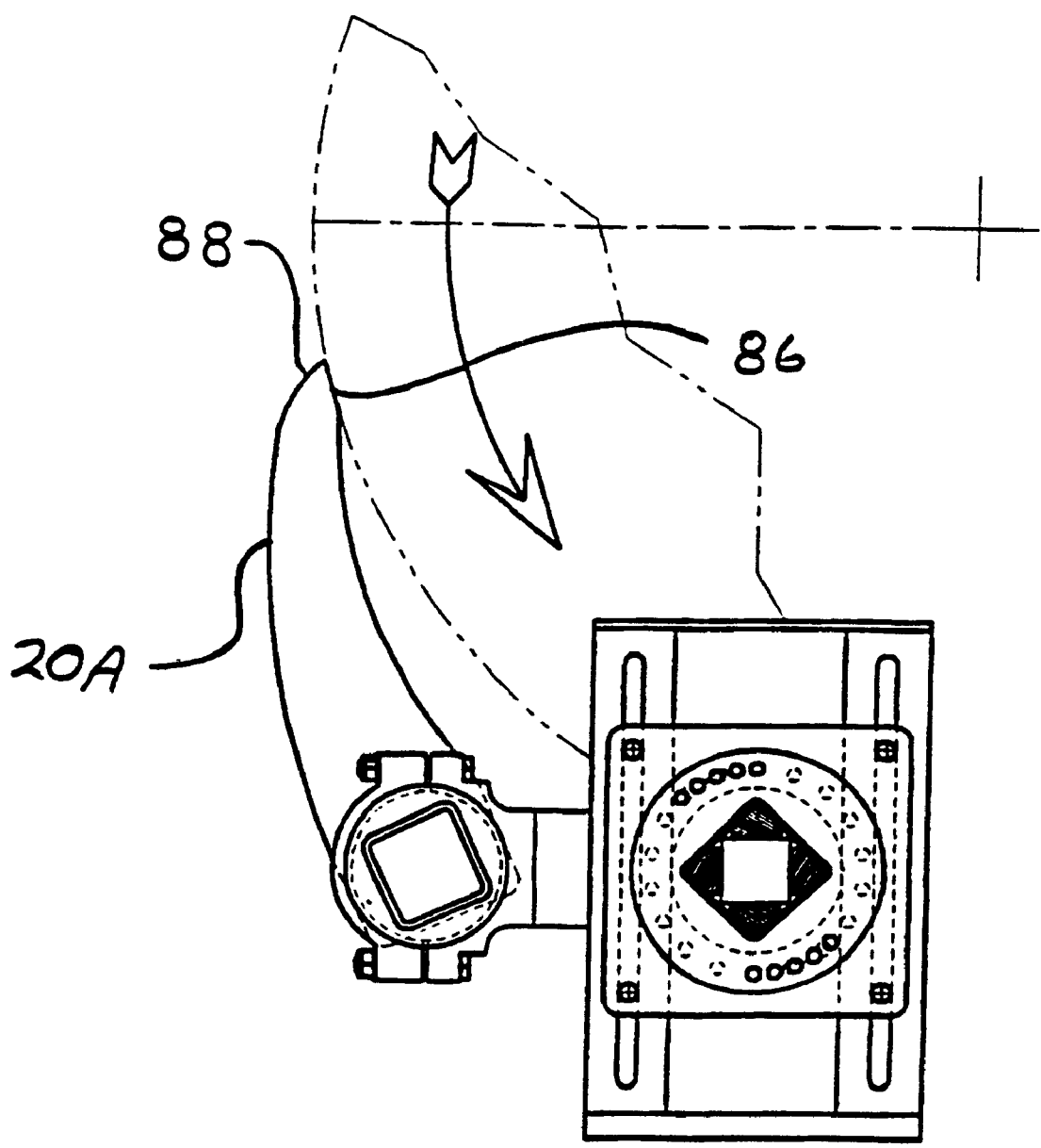

In FIG. 4 the scraper blades are at a leading outer surface of the conveyor belt directly opposite to the head pulley. FIG. 5 shows an arrangement, which uses similar components to what is shown in FIG. 4, wherein the torsion unit is lower than the position shown in FIG. 4 and the orientation is such that the scraper blades 20A extend upwardly and outwardly with what may be referred to as inner surfaces 86 in scraping engagement with the conveyor belt. This is in contrast to what is shown in FIG. 4 which shows what is referred to as outer surfaces 88 of the blades in scraping engagement with the conveyor belt.

Figure 6:
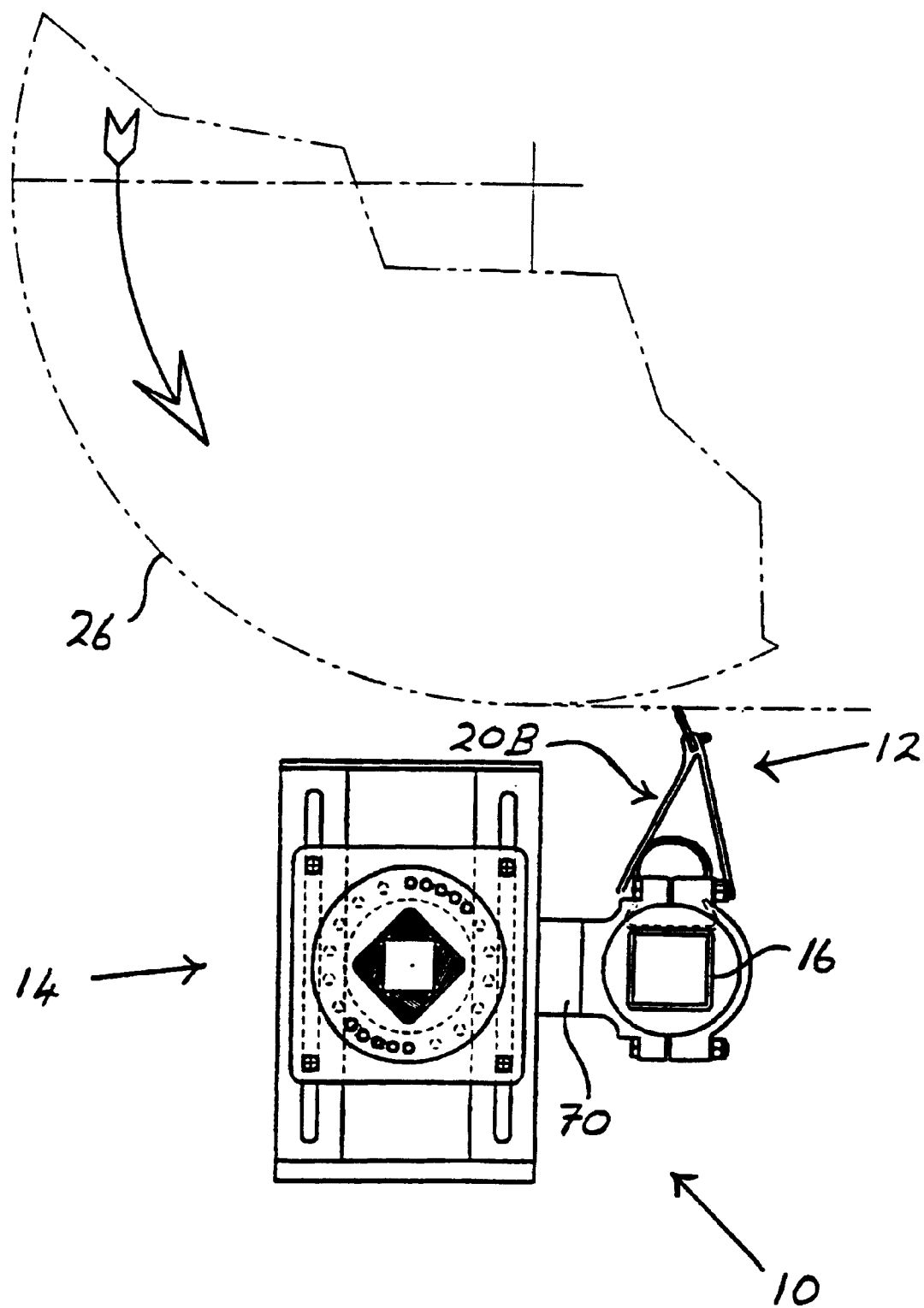
FIG. 6 shows another scraper blade type, also on an arm, with height adjustment.

FIG. 6 shows another embodiment with scraper blades 20B replacing the blades 20A shown in FIGS. 4 and 5. The arm 70 is substantially horizontal and the scraper blades 20B are positioned to extend vertically upwardly into engagement with an undersurface of the belt 26. The blades can be adjusted vertically by sliding movement relatively to the bracket 60, and rotationally by means of the clamp sections.

With each of the embodiments it is to be understood that, apart from the sliding and rotational adjustments of the scraper blades it is possible to vary the torsion force which is exerted by the torsion unit. The holes in the torsion unit flange are fairly close to one another and for example are spaced angularly apart by about 2½°. This makes it possible to vary the resilient torsion force in relatively small increments. Another possibility in this regard is to replace the torsion elements 50 with rubber of a different hardness. The lengths of the torsion elements which are inserted into the torsion tube 36 can also be altered. Another variable is the cross section of the torsion bar 38 and of the torsion tube 36.

The torsion unit operates through the bearing 32. The bearing is protected for it is fully enclosed and it is therefore not exposed to corrosive effects. The same applies to the torsion elements which are protected inside the torsion tube.

With the arrangement shown in FIGS. 2 and 3 only one torsion unit will be required. If the scraper arrangement includes an arm 70 of the kind shown in FIGS. 4, 5 and 6 then, due to the leverage which is exerted by the arm, it may be necessary to have more substantial support on opposed sides of the scraper blade. For example it may be necessary, depending on the requirements, to make use of two torsion units, on respective opposed sides of the conveyor belt, instead of making use of a single torsion unit, as is shown in FIG. 1.

What is claimed is:

1. A scraper arrangement for use with a conveyor belt comprising an elongate member having an elongate axis, at least one scraper blade is mounted to the elongate member laterally with respect to the elongate axis, a support for the elongate member which allows at least limited rotation of the elongate member around the elongate axis and relatively to the conveyor belt and to the support with the scraper blade in scraping engagement with the belt, a tubular component which is mounted for at least limited rotation relatively to the elongate member and which has at least one angular inner surface, an angular extension member which extends from and which is fixed to the elongate member and which is located at least partly inside the tubular component, at least one resiliently deformable torsion element, at least partly inside the tubular component, which acts between the angular inner surface and the extension member, and a locking device for retaining the tubular component at a selected angular orientation with the torsion element in a deformed state.

2. A scraper arrangement according to claim 1 wherein the torsion element is locked at least partly inside the tubular component bearing against a surface or surfaces of the extension member which are within the tubular component.

3. A scraper arrangement according to claim 2 further comprising a clamp, engaged with the elongate member, which permits at least limited rotational adjustment of the scraper blade relatively to the tubular component.

4. A scraper arrangement according to claim 1 or 2 which includes a mounting bracket and wherein the tubular component is mounted to the bracket for limited sliding adjusting movement relatively to the bracket.

5. A torsion unit for use with a conveyor belt scraper which includes a housing, a first flange on the housing, a tubular component which has at least one angular inner surface, an angular extension member which is located at least partly inside the tubular component and the housing, at least one resiliently deformable torsion element which is inside the tubular component and which acts between opposed surfaces of the angular inner surface and the extension member, and a second flange which is on the tubular component and which opposes the first flange, the second flange and the tubular component being rotatable to a limited extent relatively to the first flange, and a locking device for locking the second flange to the first flange at a selected angular orientation.

6. A torsion unit according to claim 5 wherein the second flange is located at an end of the tubular component and the extension member projects from the tubular component at this end.

7. A torsion unit according to claim 5 which includes a clamp which permits at least limited rotational adjustment of the scraper blade relatively to the torsion unit.

8. A torsion unit according to claim 6 further comprising a bracket to which the tubular component is mounted so that the tubular component is slidably movable, to a limited extent, relatively to the bracket.

9. A torsion unit according to claim 7 which includes a bracket to which the tubular component is mounted so that the tubular component is slidably movable, to a limited extent, relatively to the bracket.

10. A torsion unit according to claim 5 which includes a bracket to which the tubular component is mounted so that the tubular component is slidably movable, to a limited extent, relatively to the bracket.

11. A scraper arrangement for use with a conveyor belt which includes an elongate member having an elongate axis arranged parallel to a width dimension of the conveyor belt and to which at least one scraper blade is mounted laterally with respect to the elongate axis, a support for the elongate member which allows at least limited rotation of the elongate member about the elongate axis and relatively to the conveyor belt and to the support with the scraper blade in scraping engagement with the belt, a tubular component which is mounted for at least limited rotation relatively to the elongate member and which has at least one angular inner surface, an angular extension member which is fixed to the elongate member and which is located at least partly inside the tubular component, at least one resiliently deformable torsion element, at least partly inside the tubular component, acting between the angular inner surface and the extension member, a bracket to which the support is mounted so that the support is slidably movable, to a limited extent, relatively to the bracket, and a locking device for locking the tubular component at a selected angular orientation relatively to the bracket.

12. A scraper arrangement for use with a conveyor belt comprising: a support situated adjacent to the conveyor belt, a tubular component mounted for angular displacement relative to the support having an inner surface, an extension member positioned within the tubular component, a resiliently deformable torsion element situated between the inner surface of the tubular component and the extension member, an elongate member having an elongate axis arranged parallel to the conveyor belt, the elongate member being coupled to the extension member for rotational displacement around the elongate axis, a scraper blade mounted to the elongate member laterally with respect to the elongate axis for scraping engagement with the conveyor belt, and a locking device for retaining the tubular component at a selected angular orientation with respect to the support.

13. A scraper arrangement according to claim 12 wherein the extension member is coaxially positioned with respect to the elongate axis of the elongate member and is movable along the elongate axis for disengagement from and reengagement with the elongate member.

14. A scraper arrangement according to claim 12 or 13 wherein the locking device comprises a projection fixed to the tubular component and a pin coupling the projection to the support at the selected angular orientation.

15. A scraper arrangement according to claim 14 therein the projection fixed to the tubular component comprises a first flange surrounding the tubular component and the pin couples the first flange to a second flange fixed to the support.

16. A scraper arrangement according to claim 15 wherein the support further comprises a bracket including a slot, and a bolt passing through the slot couples the first flange of the tubular component to the support at an adjustable position relative to the conveyor belt.

17. A scraper arrangement according to claim 12 or 13 wherein the support further comprises a bracket including a slot, and a bolt passing through the slot couples the tubular component to the support at an adjustable position relative to the conveyor belt.

18. A scraper arrangement according to claim 17 wherein the slot comprises a pair of parallel linear slots, and the bolt comprises a plurality of bolts.

19. A scraper arrangement according to claim 17 wherein the locking device comprises a projection fixed to the tubular component and a pin coupling the projection to the bracket on the support at the selected angular orientation.

* * * * *